United States Patent [19]

Hodson et al.

[11] Patent Number: 5,521,660
[45] Date of Patent: May 28, 1996

[54] MULTIMEDIA FIELD EMISSION DEVICE PORTABLE PROJECTOR

[75] Inventors: Lester L. Hodson, McKinney; Charles E. Primm, Plano; Kenneth G. Vickers, Whitesboro, all of Tex.

[73] Assignee: Texas Instruments Inc., Dallas, Tex.

[21] Appl. No.: 460,376

[22] Filed: Jun. 2, 1995

Related U.S. Application Data

[63] Continuation-in-part of Ser. No. 315,418, Sep. 29, 1994, abandoned.

[51] Int. Cl.$^6$ .................................................. G03B 21/00
[52] U.S. Cl. .................................................. 353/122
[58] Field of Search .................................. 353/122, 120, 353/DIG. 3, DIG. 5; 348/743, 742; 313/495, 309

[56] References Cited

U.S. PATENT DOCUMENTS

| | | | |
|---|---|---|---|
| 4,857,799 | 8/1989 | Spindt et al. | 313/495 |
| 4,940,916 | 7/1990 | Borel et al. | 313/306 |
| 5,103,144 | 4/1992 | Dunham | 313/336 |
| 5,194,780 | 3/1993 | Meyer | 315/169.3 |
| 5,194,884 | 3/1993 | Parker et al. | 353/122 |
| 5,225,820 | 7/1993 | Clerc | 340/752 |
| 5,337,103 | 8/1994 | Gulick | 353/122 |
| 5,353,075 | 10/1994 | Conner et al. | 353/122 |

*Primary Examiner*—William A. Cuchlinski, Jr.
*Assistant Examiner*—William C. Dowling
*Attorney, Agent, or Firm*—Rose Alyssa Keagy; Richard L. Donaldson

[57] ABSTRACT

A field emission display panel 20, 80, and 90 is used as a projection system. Display panel 90 can be used as a stand-alone projector. Alternatively, display panel 20 can be placed on a base 10 of a standard overhead projection system 60 and the image can be projected by a lens 50 onto a surface separated from display 20. In yet another embodiment, a lens system 70 can be attached to display panel 80 to project the image on a surface separated from display 80. Display panels 20, 80, and 90 operate at a increased luminance to facilitate projection of the images displayed on the panels. The use of FED display panels 20, 80, and 90 facilitates a projection system which has low power consumption, is portable, and interfaces to a computer.

4 Claims, 2 Drawing Sheets

MULTIMEDIA FIELD EMISSION DEVICE PORTABLE PROJECTOR

RELATED APPLICATIONS

This is a continuation-in-part of co-assigned U.S. patent application Ser. No. 08/315,418, filed Sep. 29, 1994 and now abandoned. This application includes subject matter which is related to U.S. patent application Ser. No. 08/324,832, "Multimedia Field Emission Device Projection System," (Texas Instruments, Docket No. TI-19000), filed Oct. 18, 1994. This application also includes subject matter which is related to U.S. patent application Ser. No. 08/356,809, "Dual Mode Overhead Projection System Using Field Emission Device," (Texas Instruments, Docket No. TI-20036), filed Dec. 15, 1994, now U.S. Pat. No. 5,477,284.

TECHNICAL FIELD OF THE INVENTION

The present invention relates generally to projection devices and, more particularly, to a projection system which uses a field emission display device.

BACKGROUND OF THE INVENTION

As shown in FIG. 1, standard overhead projectors 1, which have been used for many years, project images from a thin transparent plastic sheet to a screen 2. Projector 1 includes a base 1a, housing a light source, and a lens 1b. The transparency is placed on top of base 1a where light emitted from the light source shines through the transparency. Lens 1b directs the image to screen 2. A disadvantage of a standard overhead projection system is that it cannot interface with a computer. The system transmits only the image printed on the transparency. Other disadvantages of standard overhead projection system are that it is too heavy to be easily portable, it produces a lot of heat, and it consumes a lot of power.

Other overhead projector systems in use today, however, are capable of interfacing with computers. One such projector system in use today is the BARCO Data 600 manufactured by BARCO Projection Systems and shown in prior art FIG. 2. The BARCO data 600 3 uses three monochrome CRT (Cathode Ray Tube) projection tubes 4, each projecting a red, green or blue image which is converged by use of colored lenses to create a color picture on screen 5. Projection system 3 can be interfaced to a computer (not shown), allowing the images displayed on the computer's CRT to also be displayed on screen 5. Disadvantages of this type of projection system are that it is not portable, and it is large because of the physical depth required by the CRT technology.

What is needed is a projection system which uses less power and generates less heat, but also interfaces to computers, is capable of displaying multimedia images, and is portable.

SUMMARY OF THE INVENTION

A field emission device (FED) display panel system, operating at an increased luminance, is used to create a projection system. The FED display panel, which can detach from the FED display system base, acts as a stand alone projector. Alternatively, the FED display panel may rest on a standard overhead projector base. In this configuration, the image on the FED display panel is projected by the standard projector's lens system onto a surface separate from the apparatus. In yet another embodiment, a lens system may attach to a FED display panel and project the image on the display panel onto a surface separate from the apparatus.

BRIEF DESCRIPTION OF THE DRAWING

The foregoing features of the present invention may be more fully understood from the following detailed description, read in conjunction with the accompanying drawings, wherein.

DESCRIPTION OF THE PREFERRED EMBODIMENT

Figure 1:
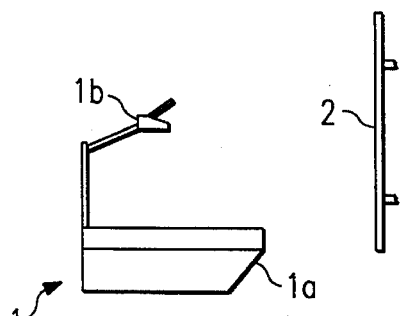
FIG. 1 is a prior art standard projection system.
Figure 2:
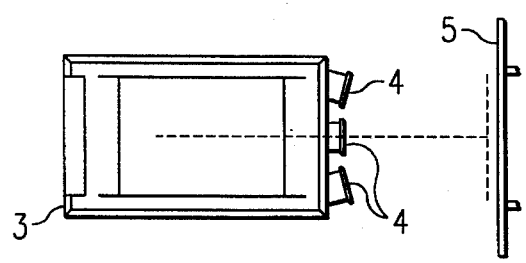
FIG. 2 is a prior art overhead projection system which interfaces to a computer.
Figure 3:
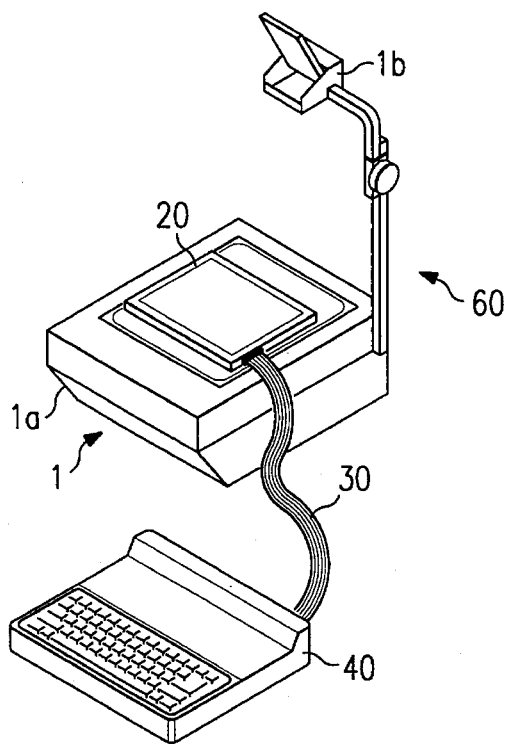
FIG. 3 is a first embodiment of a FED projection system.

FIG. 3 shows a first preferred embodiment of the present invention. A field emission device (FED) overhead projection system is constructed by placing on top of standard projector base 1a a standard FED panel 20. This standard FED panel 20 is explained in more detail below. Standard FED panel 20 is connected by cord 30 to FED base unit 40. Base unit 40 may comprise a computer keyboard in an arrangement similar to a standard notebook computer. Display information created by the electronics in base unit 40 are transmitted through cable 30 to FED display 20. The image created on FED panel 20 is projected onto a large surface such as a screen or wall through the lens 1b of the standard passive overhead projection system 1. The luminescence needed to display the images created by FED panel 20 onto a separate surface is provided by the FED panel 20, therefore, overhead projector 1 will not be powered on.

A FED flat panel display arrangement is disclosed in U.S. Pat. No. 4,857,799, "Matrix-Addressed Flat Panel Display," issued Aug. 15, 1989, to Charles A. Spindt et al., incorporated herein by reference. This arrangement includes a matrix array of individually addressable light generating means of the cathodoluminescent type having cathodes combined with luminescing means of the CRT type which reacts to electron bombardment by emitting visible light. Each cathode is itself an array of thin film field emission cathodes on a backing plate, and the luminescing means is provided as a phosphor coating on a transparent face plate which is closely spaced to the cathodes.

The backing plate disclosed in the Spindt et al. ('799) patent includes a large number of vertical conductive stripes which are individually addressable. Each cathode includes a multiplicity of spaced-apart electron emitting tips which project upwardly from the vertical stripes on the backing plate toward the face plate. An electrically conductive gate electrode arrangement is positioned adjacent to the tips to generate and control the electron emission. The gate electrode arrangement comprises a large number of individually addressable, horizontal stripes which are orthogonal to the cathode stripes, and which include apertures through which emitted electrons may pass. The gate electrode stripes are common to a full row of pixels extending across the front face of the backing structure, electrically isolated from the arrangement of cathode stripes. The anode is a thin film of an electrically conductive transparent material, such as indium tin oxide, which covers the interior surface of the face plate.

The matrix array of cathodes is activated by addressing the orthogonally related cathodes and gates in a generally conventional matrix-addressing scheme. The appropriate cathodes of the display along a selected stripe, such as along one column, are energized while the remaining cathodes are not energized. Gates of a selected stripe orthogonal to the selected cathode stripe are also energized while the remaining gates are not energized, with the result that the cathodes and gates of a pixel at the intersection of the selected horizonal and vertical stripes will be simultaneously energized, emitting electrons so as to provide the desired pixel display.

Other advances in field emission display technology are disclosed in U.S. Pat. No. 4,940,916, "Electron Source with Micropoint Emissive Cathodes and Display Means by Cathodoluminescence Excited by Field Emission Using Said Source," issued 10 Jul. 1990 to Michel Borel et al.; U.S. Pat. No. 5,194,780, "Electron Source with Microtip Emissive Cathodes," issued 16 Mar. 1993 to Robert Meyer; and U.S. Pat. No. 5,225,820, "Microtip Trichromatic Fluorescent Screen," issued 6 Jul. 1993, to Jean-Frédéric Clerc. These patents are also incorporated herein by reference.

The Clerc ('820) patent discloses a trichromatic field emission flat panel display having a first substrate comprising the cathode and gate electrodes, and having a second substrate facing the first, including regularly spaced, parallel conductive stripes comprising the anode electrode. These stripes are alternately covered by a first material luminescing in the red, a second material luminescing in the green, and a third material luminescing in the blue, the conductive stripes covered by the same luminescent material being electrically interconnected.

Figure 4:
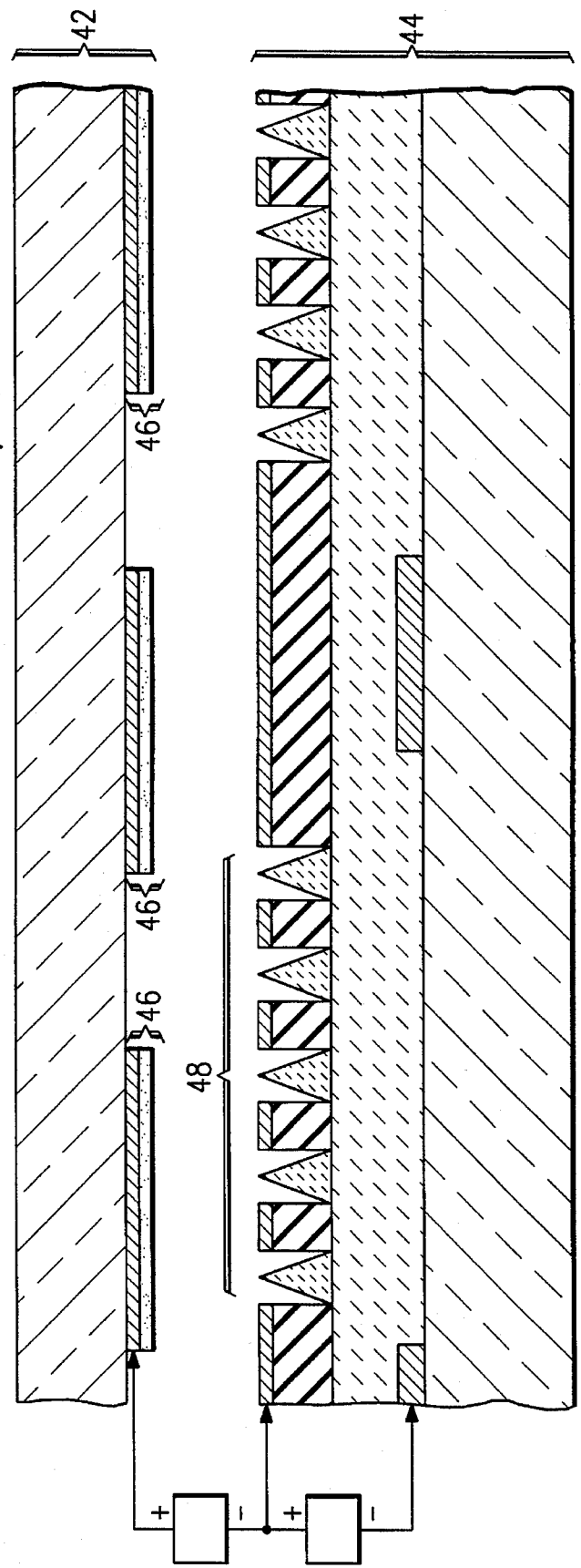
FIG. 4 is a prior art cross-sectional view of a portion of a field emission display.

Today, a conventional FED panel 20 is manufactured by combining the teachings of the Spindt et al. ('799) and Clerc ('820) patents. This typical prior art display is shown in FIG. 4. The typical FED comprises anode 42 and emitter 44. The anode 42 has red, green, and blue color stripes 46. The image created by the phosphor stripes is observed from the anode side which is opposite to the phosphor excitation, as indicated in FIG. 4.

No true scaling information is intended to be conveyed by the relative sizes and positioning of the elements of anode plate 42 and the elements of emitter plate 44 as depicted in FIG. 4. For example, in a typical FED shown in FIG. 4 there are ten sets, or matrixes, of microtips 48 and there are three color stripes 46 per display pixel.

The process of producing each display frame using a typical trichromatic field emission flat panel display 20 includes applying an accelerating potential to the red anode stripes while sequentially addressing the row lines (gate electrodes) with the corresponding red video data for that frame applied to the column lines (cathode electrodes), switching the accelerating potential to the green anode stripes while sequentially addressing the rows lines for a second time with the corresponding green video data for that frame applied to the column lines, and switching the accelerating potential to the blue anode stripes while sequentially addressing the row lines for a third time with the corresponding blue video data for that frame applied to the column lines. This process is repeated for each display frame.

Returning to FIG. 3, FED panel 20 comprises an anode plate having an electroluminescent phosphor coating facing an emitter plate, the phosphor coating creates an image observed from the side opposite to its excitation. Standard FED panels have an luminescence of 120 ft-L (foot lamberts) but standard projection systems operate at a luminance of around 600 ft-L to properly project an image. The increased luminance needed in the preferred embodiment of FIG. 3 is obtained by increasing the voltage on the anode plate of FED panel 20. Using standard triode mode techniques commonly known in the industry, a ten-fold increase in voltage results in a one hundred-fold increase in luminance. Therefore the voltage of the anode does not have to be increased greatly above the standard 700 V level used for notebook computer applications to increase the standard luminance of the panel from 120 ft-L to 600 ft-L.

In the preferred embodiment the anode of FED panel 20 will be powered at a voltage below 5,000 V and will produce a luminance up to approximately 800 ft-L. In order to protect the cathode plate from potential damage caused by a high voltage breakdown between the anode and cathode the spacing between the anode and cathode plates will be increased from 200 microns (used for lap top applications) to less than 1 cm. The exact spacing between the anode and cathode plates is determined by the FED projection system application.

The increased luminance needed in the FED projection system of FIG. 3 is too bright when the FED panel is viewed by a user in a normal lap top computer setting. Therefore, a switch on panel 20 or base 40, or a command entered through the keyboard on base 40 could be used to direct the FED panel 20 to operate at either normal or increased luminescence.

Increasing the voltage at the anode increases the heat created by panel 20. Therefore, in the preferred embodiment, the additional heat is mechanically dissipated by adding metal fins or frame to the structure of the FED panel.

Figure 5:
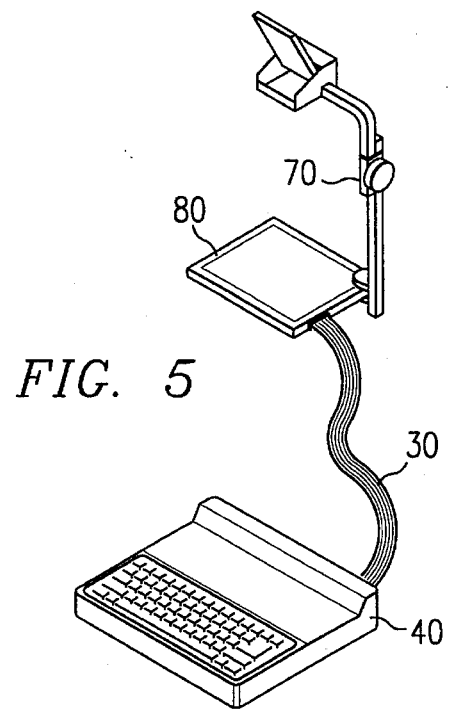
FIG. 5 is a second embodiment of a FED projection system.

In a second embodiment of the invention, shown in FIG. 5, a standard lens system 70 is mechanically attached to FED panel 80 by a means such as a clip. FED panel 80 in this embodiment acts as a portable projector and may be similar to panel 20. Lens system 70 would be very similar to the lens 1b of a standard overhead projector 1. Preferably, attachable lens system 70 would be collapsible or able to fold so that the portable projector system would be easy to carry and store.

Figure 6:
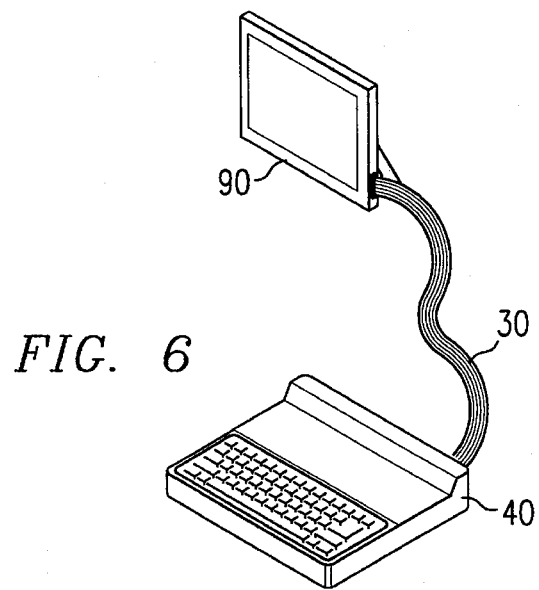
FIG. 6 is a third embodiment of a FED projection system.

In yet another embodiment of the invention, shown in FIG. 6, FED panel 90 is a portable monitor. FED panel 90, which may be similar to panel 20, is attached to FED system base 40 through cable 30. Panel 90 can stand up on a surface such as a table and may have normal luminance for close-up viewing, or may have enhanced luminance for viewing from a greater distance.

Several other variations of the above would be understood by one skilled in the art and are considered to be within the scope of the present invention. For example, the FED system and not just the FED panel 20 could be placed on overhead projector base 1a as long as the image was projected toward lens 1b.

The use of detachable FED panels 20, 80, and 90, as disclosed herein, has numerous advantages. The FED panels do not need to use any other light source; they provide their own luminance. FED technology saves power, generates less heat and takes up less space than other technologies such as liquid crystal displays and BARCO-type systems. FED projection systems are portable, convient to use and are capable or interfacing to a computer.

Still other advantages can be obtained with this invention. The FED projector system is capable of multimedia presentations. Therefore this system can display still images or video images. Also the system can display images in color or monochrome.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead by gauged by the breadth of the claims which follow.

What is claimed is:

1. A field emission device projector apparatus comprising:
    a field emission device system base, said system base providing data and control signals necessary to create FED images; and
    a field emission device display panel coupled to said system base and receiving said signals from said base, said display panel being detachable from said system base, and said display panel capable of selective operation in a low luminance, direct view display mode and a high luminance, projection display mode.

2. The apparatus in accordance with claim 1 wherein said display panel operates at a voltage less than 5,000 volts in said projection display mode.

3. The apparatus in accordance with claim 1 further comprising an overhead projector wherein said display panel rests on said overhead projector base and the image on said display panel is projected onto a surface separated from said apparatus.

4. The apparatus in accordance with claim 1 further comprising a lens system for projecting the image on said display panel onto a surface separated from said apparatus.

* * * * *